(12) United States Patent
Kim et al.

(10) Patent No.: US 9,097,377 B2
(45) Date of Patent: Aug. 4, 2015

(54) INSULATING MATERIAL CONTAINING AEROGEL AND METHOD FOR PREPARING THE SAME

(71) Applicant: AEROGEL TECHNOLOGIES CORPORATION, Gyeonggi-do (KR)

(72) Inventors: Hyo Yul Kim, Gyeonggi-do (KR); Frank Joseph Gojny, Bonita, CA (US)

(73) Assignee: AEROGEL TECHNOLOGIES CORPORATION, Gyeonggi-do (KR)

( * ) Notice: Subject to any disclaimer, the term of this patent is extended or adjusted under 35 U.S.C. 154(b) by 157 days.

(21) Appl. No.: 13/932,807

(22) Filed: Jul. 1, 2013

(65) Prior Publication Data

US 2014/0004290 A1    Jan. 2, 2014

(30) Foreign Application Priority Data

Jul. 2, 2012   (KR) .......................... 10-2012-0071822

(51) Int. Cl.
| | | |
|---|---|---|
| *F16L 59/02* | (2006.01) | |
| *C04B 30/00* | (2006.01) | |
| *C04B 14/06* | (2006.01) | |
| *C04B 14/30* | (2006.01) | |
| *C04B 111/28* | (2006.01) | |

(52) U.S. Cl.
CPC ............. *F16L 59/029* (2013.01); *C04B 14/064* (2013.01); *C04B 14/302* (2013.01); *C04B 30/00* (2013.01); *C04B 2111/28* (2013.01); *Y10T 156/10* (2015.01); *Y10T 428/233* (2015.01)

(58) Field of Classification Search
CPC ............ B32B 2260/025; Y10T 428/23; Y10T 428/239; Y10T 156/10
USPC .......................................... 428/68, 76; 156/60
See application file for complete search history.

(56) References Cited

U.S. PATENT DOCUMENTS

| | | |
|---|---|---|
| 6,479,416 B1 | 11/2002 | Frank et al. |
| 7,410,684 B2 | 8/2008 | McCormick |
| 7,790,787 B2 | 9/2010 | Williams et al. |
| 2007/0173157 A1 | 7/2007 | Trifu et al. |
| 2009/0082479 A1 | 3/2009 | Cho |
| 2010/0279044 A1 | 11/2010 | Williams et al. |

FOREIGN PATENT DOCUMENTS

| | | |
|---|---|---|
| EP | 2281962 A2 | 2/2011 |
| JP | 2006-077386 A | 3/2006 |
| KR | 10-0967421 B1 | 7/2010 |

*Primary Examiner* — Alexander Thomas
(74) *Attorney, Agent, or Firm* — Saliwanchik, Lloyd & Eisenschenk

(57) ABSTRACT

Provided herein is aerogel insulating material and a method of producing aerogel insulating material, the aerogel insulating material including an insulating layer containing aerogel particles, a adhesive-coating layer located at both surfaces of the insulating layer, and a lamination film surrounding the adhesive-coating layer, wherein the adhesive-coating layer has thermoplastic elastomer having a low glass transition temperature. The method of producing aerogel insulating material includes preparing (S10), coating (S20), drying (S30), cutting (S40), and laminating (S50).
Therefore, according to the present disclosure, it is possible to embody aerogel insulating material for use in clothing and which may reduce migration of aerogel particles, and which may make the most of the advantage of aerogel, such as its light weight and the excellent insulating effect.

10 Claims, 4 Drawing Sheets

(a) INSULATING STRUCTURE
WITHOUT ADHESIVE-COATING LAYER (b) AFTER 5 TIMES OF WASHING (c) CROSS-SECTIONAL VIEW
AFTER 5 TIMES OF WASHING (a) INSULATING STRUCTURE HAVING ADHESIVE-COATING LAYER OF PRESENT DISCLOSURE (b) AFTER 5 TIMES OF WASHING (c) CROSS-SECTIONAL VIEW AFTER 5 TIMES OF WASHING

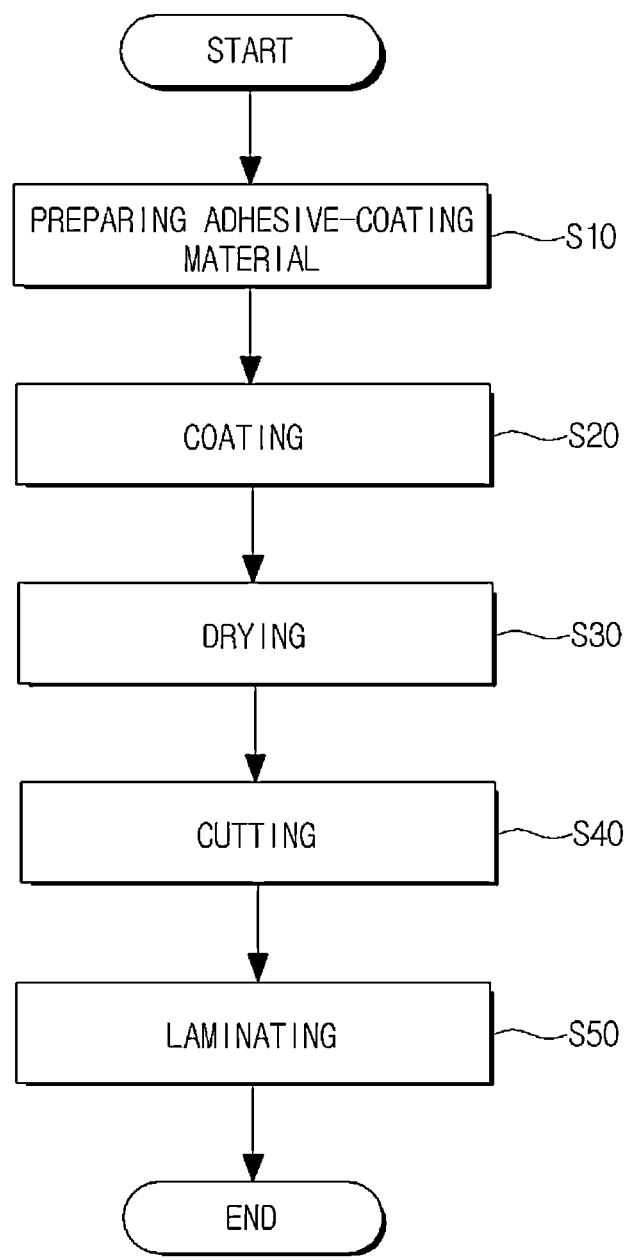

INSULATING MATERIAL CONTAINING AEROGEL AND METHOD FOR PREPARING THE SAME

CROSS-REFERENCE TO RELATED APPLICATION

This application claims the benefit under 35 U.S.C. §119 of Korean Patent Application No. 10-2012-0071822, filed Jul. 2, 2012, which is hereby incorporated by reference in its entirety.

BACKGROUND

1. Field of the Invention

The following description relates to an aerogel insulating material and manufacturing method thereof, and more particularly to an aerogel insulating material consisting of an insulating layer containing aerogel particles; an adhesive-coating layer containing an inorganic solvent, thermoplastic elastomer and additive on both surfaces of the insulating layer; and a lamination film. The thermoplastic elastomer of the adhesive-coating layer may be made of ethylenevinyl acetate copolymer or polyurethane having a low glass transition temperature, and through this characteristic, it is possible to strengthen the adhesive and embody an insulating material insulating structure having excellent durability and low migration rate of the aerogel particles.

2. Description of Related Art

Aerogel is a compound word of air meaning air and gel meaning solidified liquid. Aerogel consists of silicon oxide ($SiO_2$) threads each of which is $1/10,000$ thick of a strand of hair sparsely tangled. Between each silicon oxide thread, there are air molecules which take up 98% of the total volume. The density of aerogel is approximately 0.003 g/m$^3$, that is, 3 times the air density (0.001 g/m$^3$), the lightest solid on earth.

The diameter of a hole in the aerogel is smaller than the average transition distance of an air particle, and thus the aerogel airtight, thereby effectively preventing heat conduction. The heat conductivity of the aerogel is so low that even when placed on a palm of a hand and fire flames of 1,000° C. or above are placed close to the palm, heat is not conducted very well. Furthermore, an advantage of aerogel is that it has a high intensity that even when an automobile is placed on top of 4 aerogels each having the size of a palm of a hand, the aerogel would not break. Hence, it is suitable as insulating material. Therefore, there are various application fields for aerogel, for examine, clothing and industrial insulating material etc.

When applying such aerogel to products, aerogel particles must be put inside capsules to prevent them from migration. For example, aerogel particles migrated from insulating material such as clothing are rather rough and thus may easily irritate human skin tissues, which is a problem. Several methods have been used for application in products, but conventional aerogel particles easily migrate, lack resistance against mechanical washing and drying, and are ineffective in insulating.

Accordingly, it is desirable to develop a technology which could prevent easy migration of aerogel particles when using products containing aerogel, thereby maintaining the low heat conductivity and low weight characteristics of the aerogel.

BRIEF SUMMARY

A purpose of the present invention is to resolve the aforementioned problems of prior art, that is, to configure aerogel insulating material to comprise an insulating layer containing aerogel particles, an adhesive-coating layer and a lamination film; and to use an thermoplastic elastomer having a low glass transition temperature so as to increase wettability within an insulating layer containing aerogel particles and thus increase the adhesion, thereby providing aerogel insulating material having excellent durability and preventing migration of aerogel particles.

Another purpose of the present disclosure is to provide a method of manufacturing an aerogel material insulating structure by determining an optimal step for using aerogel material in insulating material in clothings, shoes, outdoor equipments, protective clothings, or industrial insulating material, by applying adhesive-coating material consisting of thermoplastic elastomer to an insulating layer containing aerogel particles, and laminating the result thereof.

In one general aspect, there is provided aerogel insulating material comprising an insulating layer containing aerogel particles; an adhesive-coating layer located at both surfaces of the insulating layer; and a lamination film surrounding the adhesive-coating layer, wherein the adhesive-coating layer comprises a solvent, thermoplastic elastomer, and additive, and the thermoplastic elastomer has a glass transition temperature between 60 to 150° C. The adhesive-coating layer may consist of 50 to 650 parts by weight of thermoplastic elastomer, and 3 to 30 parts by weight of additive, regarding 100 parts by weight of the solvent. The adhesive-coating layer may desirably include an ethylenevinyl acetate copolymer or polyurethane. The lamination film may include thermoplastic elastomer.

In another general aspect, there is provided a method of producing aerogel insulating material including preparing adhesive-coating material; coating both surfaces of an insulating layer comprising aerogel particles with the adhesive-coating material; and laminating a film on the coated insulating layer by lamination processing, wherein in the preparing, the adhesive-coating material comprises a solvent, thermoplastic elastomer, and additive, and the adhesive-coating material consists of 50 to 650 parts by weight of thermoplastic elastomer, and 3 to 30 parts by weight of additive, regarding 100 parts by weight of the solvent, and the thermoplastic elastomer has a glass transition temperature between 60 to 150° C. In the preparing, the thermoplastic elastomer may desirably be an ethylenevinyl acetate copolymer or polyurethane, and in the preparing, a adhesion of the adhesive-coating material may be between 300 to 4,500 cps. In the laminating, a temperature during the laminating process may desirably be between 60 to 180° C., and in the laminating, a speed during the laminating process may be between 0.5 to 20 m/min, and a pressure during the lamination process may be between 0.1 to 0.8 MPa. In the coating, a thickness of a coating of the adhesive-coating material may desirably be between 5 to 200 μm.

According to the present invention, an adhesive-coating layer which includes a thermoplastic elastomer having a low glass transition temperature is applied between an insulating layer containing aerogel particles and a lamination film, which increases wettability among adhesive surfaces so as to secure a broad initial adhesion area, improving adhesion. Due to the aforementioned, it is possible to effectively reduce the aerogel particles and further strengthen the durability of sandwich-shaped insulating structure, and thus provide an optimized insulating structure suitable to be applied to insulating material in clothings, shoes, outdoor equipments, protective clothings, or industrial insulating material.

In processing an insulating layer containing aerogel particles, there is provided a method where thermoplastic elastomer having a low glass transition temperature is used as the coating adhesive material, and where characteristics of aerogel are maintained the most through a cutting step such as a water jet cutter.

BRIEF DESCRIPTION OF THE DRAWINGS

FIG. 5 is a flowchart of a method of manufacturing an aerogel material insulating structure of the present disclosure.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increase clarity and conciseness.

Figure 1:
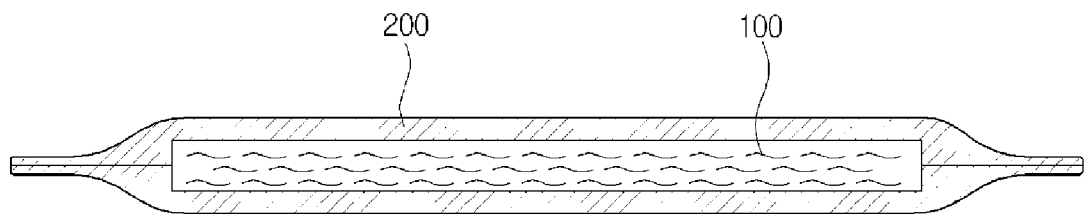
FIG. 1 is a cross-sectional view of a conventional aerogel material insulating structure.
Figure 2:
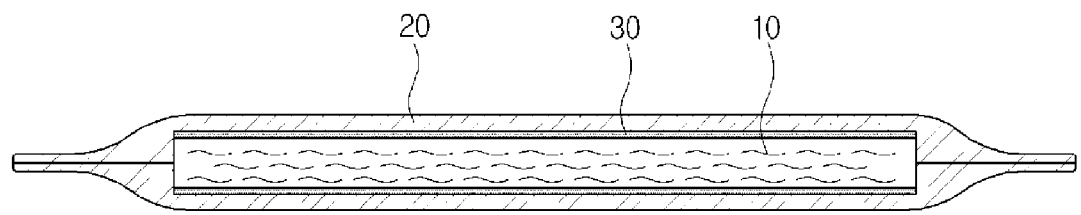
FIG. 2 is a cross-sectional view of an aerogel material insulating structure of the present disclosure.

As illustrated in FIG. 1, there has been problems in conventional aerogel insulating material, such as since a lamination film 300 is laminated on an insulating sheet 100 containing aerogel particles without any additional coating, low adhesion makes the aerogel particles to ooze out, and mechanical impacts scatter the aerogel batting matrix, significantly reducing the insulating effects.

Unlike conventional aerogel insulating material, the present disclosure relates to aerogel insulation material including an insulating layer 10 containing aerogel particles, an adhesive-coating layer 20, and a lamination film 30.

The insulating layer 10 containing aerogel particles have aerogel particles in a fiber matrix, and a desirable thickness of the insulating layer 10 is 1 to 10 mm. Such an insulating layer 10 has an extremely low heat conductivity of 12 to 17 mw/mK.

In order to prepare the insulating layer 10 containing aerogel particles, an aerogel batting matrix is divided in lengths required to optimize a product, using a net-shape rotating blade. Herein, there is used machine having a supply roller made to have a special texture in consideration of the characteristics of the aerogel batting matrix and the extent of friction resistance that the product itself has. The process of dividing the aerogel batting matrix must be performed wearing a protective suite for preventing contact with aerogel particles in an airy space.

The present disclosure is characterized to have an adhesive-coating layer 20 located on or above both surfaces of the insulating layer 10 containing aerogel particles as prepared in the aforementioned process.

The adhesive-coating layer 20 is formed to contain a solvent, thermoplastic elastomer and additive. The thermoplastic elastomer plays a role of adhering the aerogel material insulating layer 10 and the lamination film 30, and is also the most important element for preventing migration of the aerogel particles.

It has been found that, in using the aerogel material insulating material in the present disclosure, of among various factors of the adhesive material, the following factors are important for enhancing the adhesive property of the adhesive material. First of all, adhesion refers to the bonding force between the adhesive material and the interface of the adhered object. Under a same application temperature, the adhered area size, adhesion pressure, and adhesion time are determined by the application conditions, and in general, the greater the adhered area size and the adhesion pressure, and the longer the adhesion time, the greater the adhesion. Secondly, holding power (cohesion) refers to the inner cohesion, that is, the intensity, and is a type of creep property. In general, the greater the molecular weight of high molecules, the greater the holding power (cohesion), and the higher the glass transition temperature, the higher the holding power (cohesion). Lastly, an initial tack refers to an initial adhesion or instant adhesive property, and such an initial adhesion is affected by the wettability of the adhesive material under the same application conditions. The greater the wettability of the adhesive material, the greater the initial adhesion size area, thereby increasing the adhesion. Factors that affect the wettability of the adhesive material are functional group property, glass transition temperature, and molecular weight etc. That is, the greater the affinity the functional group has with the adhered object, the lower the glass transition temperature, and the lower the molecular weight, the higher the wettability.

It is desirable that the thermoplastic elastomer has a low glass transition temperature (Tg), and it is more desirable that the glass transition temperature (Tg) is 60 to 150° C., and it is even more desirable that the glass transition temperature (Tg) is 60 to 100° C. Glass transition temperature refers to the center of the temperature range where an amorphous solid transforms from a runny state such as glass to an adhesive state, and the lower the glass transition temperature, the greater the flexibility, thereby increasing the initial adhesion. Thermoplastic elastomer having a low glass transition temperature may penetrate deeply into the insulating layer due to the high surface wettability of the aerogel particles, and thus enables the aerogel particles to be bonded to the aerogel batting matrix more firmly, reducing the phenomenon of aerogel particles migrating and oozing out. In addition, the increased wettability causes the aerogel particles to be bonded to the lamination film 30 firmly, enabling the structure of the finally produced insulating material panel to have excellent durability and stability. When the glass transition temperature is less than 60° C., the internal holding power of the adhesive material itself decreases, affecting the entire holding power, whereas when the glass transition temperature goes beyond 150° C., the low wettability decreases the initial adhesion between the insulating layer 10 containing aerogel and the lamination film 30, causing the aerogel particles to ooze out.

Thermoplastic elastomer is a material which has both the elasticity of conventional rubber and the processability of thermoplastic resin. There is no limitation to the type of the adhesive material, but it is desirable to use ethylene-vinylacetate copolymer (EVA) or polyurethane. Ethylene-vinylacetate has an excellent stress-resistance cracking property and thus is suitable for the lamination process, and it especially has an excellent impulse-resistance at low temperatures and thus is suitable to be used as the adhesive-coating material of insulating material. Polyurethane has excellent tensile strength, abrasion resistance, and thermal property, and good chemical resistance. In addition, polyurethane is capable of softness change without using a plasticizer, and thus is suitable as an adhesive-coating material of insulating material. In addition, ethylene-vinylacetate copolymer (EVA) and polyurethane has a low soft glass transition temperature, and thus exist in rubber phase at room temperature. Furthermore, ethylene-vinylacetate copolymer (EVA) and polyurethane have several hundreds to thousands of molecular weight, and thus the chains are tangled indiscriminately, enabling high elongation. Thus, ethylene-vinylacetate copolymer (EVA) and polyurethane are effective in preventing the aerogel particles from migrating from the fiber matrix.

It is desirable that the adhesive-coating layer consists of 50 to 650 parts by weight of thermoplastic elastomer, more desirably, 120 to 500 parts by weight, and most desirably 150 to 450 parts by weight, regarding 100 parts by weight of the solvent. The content of thermoplastic elastomer included in the coating adhesion layer 20 affects the wettability, and thus it is important to adjust the content so as to increase the wettability and bonding strength of the adhesive material. When the adhesive-coating layer consists of less than 50 parts by weight of thermoplastic elastomer, the adhesive function is not sufficient enough, thereby reducing the peeling strength between the insulating layer 10 containing aerogel and the lamination film 30, while when the adhesive-coating layer consists of more than 650 parts by weight of thermoplastic elastomer, the content of thermoplastic elastomer in the adhesive-coating material is high, making it difficult to apply the adhesive material lightly. Herein, the distance between the insulating layer 10 containing aerogel and the lamination film 30 is wide, which makes it difficult to prevent migration of the aerogel particles efficiently.

The coating layer is configured to contain an additive, desirably a tackifier or a cross-linking agent. The adhesion applying material maintains and improves adhesion, and rosin derivative, terpene resin, C-5, C-9, phenolic resin are effective adhesion applying material. Since adhesive-coating layer is shaped as emulsion, it is efficient to use emulsion type adhesion applying materials when producing a coating layer. A cross-linking agent improves water resistance, strengthens adhesive property, and strikes a balance between the initial tack and the holding power. Polyamide epichlorohydrin is an effect cross-linking agent.

In addition, the adhesive-coating layer consists of 3 to 30 parts by weight of additive, regarding 100 parts by weight of the solvent. When the adhesive-coating layer consists of less than 3 part by weight of additive, the balance between the initial tack and the holding power breaks, and the extent of the initial tack is reduced or the holding power is significantly reduced, weakening the adhesion. In such a case, aerogel particles may easily migrate by mechanical and physical impact. When the adhesive-coating layer consists of more than 3 part by weight of additive, the adhesion is reduced, thereby peeling off the insulating layer 10 containing aerogel and the lamination film 30.

The lamination file 30 exists at a state where it covers the adhesive-coating layer 20, and is subject to the lamination process to be explained hereinbelow. By encapsulating the insulating layer 10 containing aerogel and adhesive-coating layer 30, it is possible to create the final panel structure as various insulating material such as clothings such outer clothes, underwear, hats, and gloves; shoes; outdoor equipments such as sleeping pads, tents, insulating containers; protective clothings; industrial insulating material etc., and lamination film 30 plays a role of further fixating the aerogel particles through a strong sealing.

It is desirable that the lamination film 30 is configured to include thermoplastic elastomer having excellent flexibility. This is because the coating adhesive material may be attached to the lamination film more firmly when the lamination film 30 consists of similar components as the adhesive-coating layer 20.

Next, a method of producing aerogel insulating material of the present disclosure includes preparing (S10), coating (S20), and lamination (S30).

In the preparing (S10), which is the step of preparing adhesive-coating material, material to be applied on both surfaces of the insulating layer 10 containing aerogel is prepared.

The adhesive-coating material is configured to include a solvent, thermoplastic elastomer, and additive, and the adhesive-coating layer consists of 50 to 650 parts by weight of thermoplastic elastomer, and 3 to 30 parts by weight of additive, regarding 100 parts by weight of the solvent. It is desirable that the glass transition temperature of thermoplastic elastomer is 60 to 150° C., and although there is no limitation to the type of the thermoplastic elastomer, it is desirable to use ethylenevinyl acetate copolymer or polyurethane as the thermoplastic elastomer.

In producing the adhesive-coating material, either organic solvent or inorganic solvent may be used, but desirably inorganic solvent may be used, more desirably water-based solvent, and most desirably water may be used as the solvent. Adhesive-coating material produced by using organic solvent may damage the aerogel directly or indirectly, and thus may reduce the insulating effect, and further, for environmental reasons, inorganic solvent, especially water is preferred.

The desirable adhesiveness of the adhesive-coating material is 300 to 4,500 cps, and more desirably 1,000 to 3,500 cps. The adhesiveness of the adhesive-coating material is defined by the resistance inside the fluid, and when the adhesiveness is less than 300 cps, wettability is reduced and thus the bonding strength is reduced, whereas when the adhesiveness exceeds 4,500 cps, due to the extremely high adhesiveness, it is difficult to lightly coat the adhesive-coating material, and thus the distance between the insulating layer containing aerogel and the lamination film widens, thereby increasing the probability of migration of the aerogel particles.

Next, coating step (S20) is a step of coating both surfaces of the insulating layer 10 containing aerogel particles with the adhesive-coating material prepared in the previous step.

The desirable coating thickness of the adhesive-coating material is 5 to 200 μm, and more desirably 10 to 100 μm. When the coating thickness is less than 5 μm, since just a small amount of adhesive-coating material is used, the insulating layer 10 and the lamination film 30 may not be adhered sufficiently, whereas when the coating thickness exceeds 200 μm, the adhesion may increase, but due to the widened distance between the insulating layer 10 and the lamination film 30, there occurs a problem of aerogel particles oozing out.

Various coating methods may be used, but a roller type coating method is desirable. Roller type coating methods include Direct Roll Coater, Reverse Roll Coater, Calendar Coater, Kiss Roll Coater, Nip Coater, Flexor Coater etc. More desirably, the Double Roll Coater method is effective. In this method, it is possible to have the paint and adhesive material pass between two rolls, applying adhesive-coating material by a thickness of 5 to 200 μm.

After the adhesive-coating material is applied thereto, it is desirable to perform drying (S30) and cutting (S40).

Drying (S30) is a step of applying adhesive-coating material to the insulating layer 10 containing aerogel particles, and then drying the same using a drying conveyor where significant amount of air and heat flow have been applied. At the drying step (S30), the adhesive-coating material containing solvent is bonded and fixated further firmly to the insulating layer 10 containing aerogel. It is desirable to use water as the solvent.

The cutting (S40) is a step of cutting in specific shapes or sizes when necessary. Die-cutting method or Water Jet Cutting method may be used at the cutting step (S40), but the Water Jet Cutting method is a more desirable cutting method. The insulating layer 10 containing aerogel is generally coated with hydrophobic material to prevent water absorption, and thus the insulating layer 10 is not affected even when using the Water Jet Cutting method. The Water Jet Cutting method also has an advantage of Computerized Numerical Control (CNC).

When using the Water Jet Cutting method, a drying process is required after the cutting. The insulating layer 10 is dehumidified in an oven until its relative humidity drops to approximately 25%, and then kept in the oven until the lamination process starts. The drying process in the oven is a step for performing an optimal insulating function by preventing transition of additional heat possibly caused by a transition of humidity within the insulating layer.

Lastly, the laminating step (S50) is a step of attaching a lamination film to the insulating layer 10 containing aerogel particles and the adhesive-coating layer 20 by a lamination process, so as to encapsulate the insulating layer 10 and adhesive-coating layer 20. Finally, a process is performed for use in various insulating material such as clothings for example outer clothes, underwear, hats, and gloves; shoes; outdoor equipments such as sleeping pads, tents, insulating containers; protective clothings; industrial insulating material etc., and migration of aerogel articles are prevented completely through an even stronger sealing.

There is no limitation to the type of a lamination apparatus used at the lamination step (S50). The lamination apparatus includes an insulating layer 10 containing aerogel and a pre-heating table which enables efficient placing of the adhesive-coating layer 20. Pre-heating is performed for surface activation reinforcing the bonding process. The lamination apparatus has two control heated rollers which effectively applies pressure to the bonding strength between the differentiated lamination material layers. In addition, the control heated rollers are coated with silicone rubber. Herein, high-quality RTV (Room Temperature Vulcanized) silicon rubber is used. The RTV silicon rubber tolerates extreme heat increase and high loading pressure, and has excellent surface suitability. In the lamination process, air and humidity is removed to improve the durability and insulating efficiency of the finally formed panel structure.

The insulating structure produced due to the high lamination temperature at the lamination process after applying the adhesive-coating layer 20 containing thermoplastic elastomer having a low glass transition temperature to the insulating layer containing aerogel particles gets to have excellent penetrating force and structural integrity. The insulating structure is configured to have a sandwich structure of the insulating layer 10 containing aerogel particles, adhesive-coating layer 20, and lamination film 30, and thus has excellent intensity.

The desirable temperature during the process at the laminating step is 60 to 150° C., more desirably 90 to 140° C. When the temperature is below 60° C., due to the low temperature, lamination is not performed completely, causing the aerogel particles to ooze out of the lamination film, whereas when the temperature exceeds 150° C., the high temperature may make the aerogel lose its properties.

The desirable speed during the process at the laminating step is 0.5 to 20 m/min, more desirably 1 to 10 m/min. When the speed is below 0.5 m/min, the laminating is performed too slowly and thus a same portion may be exposed to the high temperature for a long time, which may damage the aerogel particles, whereas when the speed is above 20 m/min, the lamination film may easily fall off. The desirable pressure during the process at the laminating step is 0.1 to 0.8 MPa, more desirably 0.15 to 0.5 MPa. The aforementioned range of the pressure of lamination is determined based on the same reason as the lamination speed. Therefore, it is possible to maximize the effect of preventing migration of aerogel particles and minimize any damage to the aerogel particles when the speed is 0.5 to 20 m·min and the pressure is 0.1 to 0.8 MPa during the lamination process.

Furthermore, it is desirable that the lamination apparatus has a cooling blower in addition to the control heated roller. This is to preserve the efficient adhesion strength and to maintain the lamination strength.

Herein below is explanation on a peeling test conducted to identify the extent of adhesion regarding the insulating layer 10 containing aerogel and the lamination film 30 when the aerogel insulating material produced by the present disclosure used thermoplastic elastomer as the adhesive-coating material. The peeling test was conducted on a sample which had not been coated at all but which had received a lamination process (comparative embodiment 1), on another sample which had been coated with a general coating material at an initial development step and which had received a lamination process (comparative embodiment 2), and on another sample which had been coated with a coating material of the present disclosure and which had received a lamination process (exemplary embodiment). This test was conducted by the METHOD-STRIP TYPE A apparatus, and the length of the samples were 30 mm.

TABLE 1

|  | 1st | 2nd | 3rd | 4th | 5th | Average |
|---|---|---|---|---|---|---|
| Comparative embodiment 1 | 5.3 | 4.8 | 22.0 | 11.2 | 13.3 | 11.3 |
| Comparative embodiment 2 | 229.8 | 19.0 | 407.6 | 21.7 | 251.6 | 185.9 |
| Exemplary embodiment | 484.9 | 482.9 | 244.5 | 412.5 | 354.7 | 395.9 |

(Measurement unit of peeling strength: N/M)

Regarding the above [Table 1], in the case of comparative embodiment 1 which had not been coated with coating material had the lowest average peeling strength, 11.3N/M, and thus when not coated, the insulating layer 10 containing aerogel particles and the lamination film 30 may easily fall off, enabling migration of aerogel particles. On the other hand, in the case of the exemplary embodiment which had been coated with adhesive-coating material containing thermoplastic elastomer having a low glass transition temperature, the average peeling strength was 395.9N/m, which is 35 times that of comparative embodiment 1, and 2 times or above that of comparative embodiment 2 which had been coated with adhesive-coating material at an initial development step. A panel having an aerogel material insulating structure as in the exemplary embodiment has great adhesion and thus aerogel particles cannot ooze out easily, and also has great durability of insulating structure and thus may tolerate physical and mechanical impact. Therefore, such a panel is suitable for material for functional clothing.

Herein below is explanation on a washing test conducted 5 times on a sample which had not been coated but which had received a lamination process and on a sample of an insulating structure of the present disclosure in order to examine the structural effects that an adhesive-coating layer has on the insulating structure.

Figure 3:
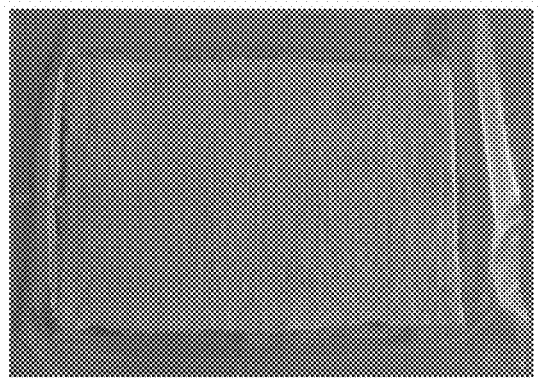
FIG. 3 is a photograph of a washing test result of a conventional aerogel material insulating structure.
Figure 3:
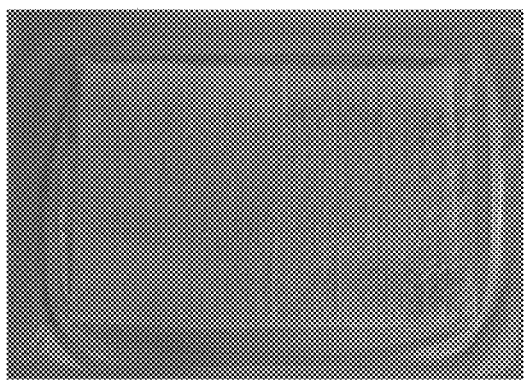
Figure 3:
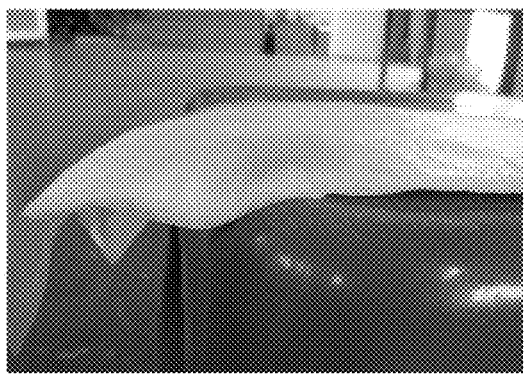
Figure 4:
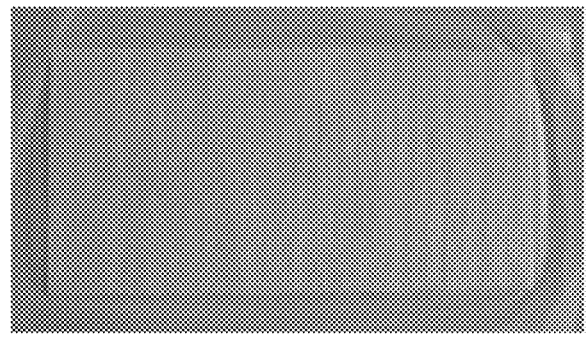
FIG. 4 is a photograph of a washing test result of an aerogel material insulating structure of the present disclosure.
Figure 4:
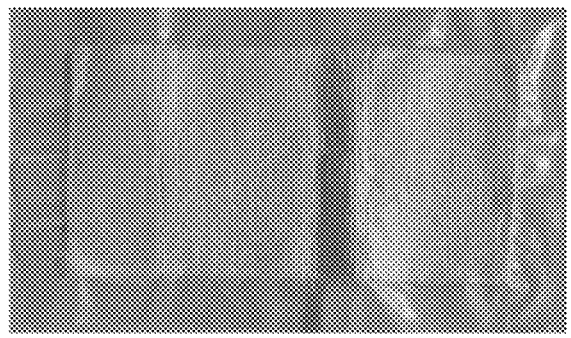
Figure 4:
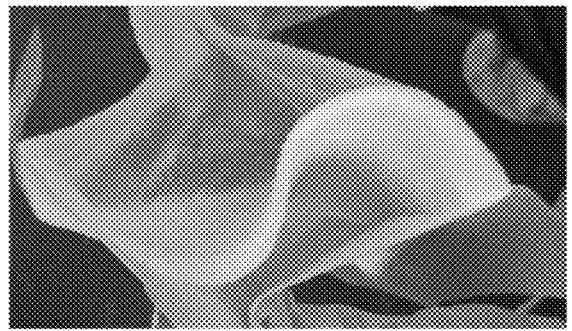

FIG. 3 illustrates a result of a washing test conducted on a sample which had not been coated with adhesive-coating material but which received a lamination process. After the washing, the insulating structure panel appeared uneven overall. In addition, according to the cross-sectional view, the aerogel batting matrix is concentrated on one side, the attached surface of the lamination film 30 is away from the broad range, indicating extreme migration of the aerogel particles. On the other hand, FIG. 4 is a sample which had been coated with adhesive-coating material and which received a lamination process. Herein, the aerogel batting matrix is kept even overall, and thus there are no great changes in the thickness and no great effect on the insulating function. In addition, according to the cross-sectional view, there is only a small gap of the lamination film 30, indicating small migration of aerogel particles. This it because, using adhesive-coating material increased the adhesion between the insulating layer 10 containing aerogel particles and the lamination film 30, thereby keeping the matrix in the insulating layer even. It is also because the durability of the final insulating structure panel and the structural stability increased as well. Therefore, there is provided a mechanical property which may reduce migration of aerogel particles and which is suitable for use in clothing.

Therefore, it is possible to embody an insulating structure for realizing durability for use in clothing and structural integrity by coating adhesive-coating material on both surfaces of the insulating layer 10 containing aerogel particles to form the adhesive-coating layer 20 and laminating the same, in order to apply aerogel which is new light material having an insulating effect.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

EXPLANATION ON REFERENCE NUMERALS

100: INSULATING LAYER CONTAINING AEROGEL PARTICLES
200: LAMINATION FILM
10: INSULATING LAYER CONTAINING AEROGEL PARTICLES
20: LAMINATION FILM
30: ADHESIVE-COATING LAYER

What is claimed is:

1. Aerogel insulating material comprising:
   an insulating layer containing aerogel particles;
   an adhesive-coating layer located at both surfaces of the insulating layer; and
   a lamination film surrounding the adhesive-coating layer,
   wherein the adhesive-coating layer comprises thermoplastic elastomer and an additive, and the thermoplastic elastomer has a glass transition temperature between 60 to 150° C.

2. The aerogel insulating material according to claim 1,
   wherein the adhesive-coating layer comprises 50 to 650 parts by weight of the thermoplastic elastomer, and 3 to 30 parts by weight of the additive.

3. The aerogel insulating material according to claim 1,
   wherein the adhesive-coating layer comprises an ethylenevinyl acetate copolymer or polyurethane.

4. The aerogel insulating material according to claim 1,
   wherein the lamination film comprises thermoplastic elastomer.

5. A method of producing aerogel insulating material, comprising:
   preparing adhesive-coating material;
   coating both surfaces of an insulating layer comprising aerogel particles with the adhesive-coating material; and
   laminating a film on the coated insulating layer by lamination processing,
   wherein in the preparing, the adhesive-coating material comprises a solvent, thermoplastic elastomer, and additive, and the adhesive-coating material comprises of 50 to 650 parts by weight of thermoplastic elastomer, and 3 to 30 parts by weight of additive, regarding 100 parts by weight of the solvent, and
   the thermoplastic elastomer has a glass transition temperature between 60 to 150° C.

6. The method of producing aerogel insulating material according to claim 5,
   wherein in the preparing, the thermoplastic elastomer is an ethylenevinyl acetate copolymer or polyurethane.

7. The method of producing aerogel insulating material according to claim 5,
   wherein in the preparing, an adhesion of the adhesive-coating material is between 300 to 4,500 cps.

8. The method of producing aerogel insulating material according to claim 5,
   wherein in the laminating, a temperature during the laminating process is between 60 to 180° C.

9. The method of producing aerogel insulating material according to claim 5,
   wherein in the laminating, a speed during the laminating process is between 0.5 to 20 m/min, and a pressure during the lamination process is between 0.1 to 0.8 MPa.

10. The method of producing aerogel insulating material according to claim 5,
    wherein in the coating, a thickness of a coating of the adhesive-coating material is between 5 to 200 μm.

* * * * *